(12) United States Patent
Harbeck et al.

(10) Patent No.: US 8,783,617 B2
(45) Date of Patent: Jul. 22, 2014

(54) AIRCRAFT FUSELAGE DRAG REDUCTION BLIVET

(75) Inventors: Michael W. Harbeck, Santa Clarita, CA (US); Brian Quayle, Lancaster, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 227 days.

(21) Appl. No.: 13/445,815

(22) Filed: Apr. 12, 2012

(65) Prior Publication Data
US 2013/0270391 A1   Oct. 17, 2013

(51) Int. Cl.
    *B64C 1/38*   (2006.01)
(52) U.S. Cl.
    USPC .................................. 244/130; 244/13
(58) Field of Classification Search
    USPC ........................................ 244/130, 13
    See application file for complete search history.

(56) References Cited

U.S. PATENT DOCUMENTS

| | | | |
|---|---|---|---|
| 2,874,922 A * | 2/1959 | Whitcomb ................ 244/130 |
| 2,998,947 A | 9/1961 | Alan | |
| 3,419,232 A * | 12/1968 | McStay et al. ............. 244/119 |
| 3,794,274 A | 2/1974 | Eknes | |
| 4,736,913 A | 4/1988 | Bennett et al. | |
| 5,676,333 A * | 10/1997 | Rethorst ..................... 244/15 |
| 5,730,391 A * | 3/1998 | Miller et al. ................. 244/36 |
| 5,769,358 A | 6/1998 | Hahl et al. | |
| 5,891,551 A * | 4/1999 | Gibbs ........................ 428/156 |
| 5,899,413 A | 5/1999 | Hager et al. | |
| 5,934,607 A * | 8/1999 | Rising et al. ................ 244/1 N |
| 5,961,068 A | 10/1999 | Wainfan et al. | |
| 6,056,238 A | 5/2000 | Soeder et al. | |
| 6,138,946 A * | 10/2000 | Saiz ............................ 244/13 |
| 6,149,101 A | 11/2000 | Tracy | |
| 6,283,407 B1 | 9/2001 | Hakenesch | |
| 6,378,802 B1 | 4/2002 | Saiz | |
| 6,378,803 B1 * | 4/2002 | Saiz ............................ 244/36 |
| 6,715,717 B2 * | 4/2004 | Dixon et al. ................ 244/130 |
| 6,729,577 B2 | 5/2004 | Morgenstern | |
| 6,957,792 B2 * | 10/2005 | Saiz ............................ 244/36 |
| 7,118,071 B2 * | 10/2006 | Bogue ........................ 244/130 |
| 7,252,263 B1 | 8/2007 | Hagemeister et al. | |
| 7,309,046 B2 | 12/2007 | Makino | |
| 7,311,287 B2 | 12/2007 | Morgenstern et al. | |

(Continued)

FOREIGN PATENT DOCUMENTS

EP   1407963   4/2004
GB   223613    10/1924

*Primary Examiner* — Christopher P Ellis
*Assistant Examiner* — Medhat Badawi
(74) *Attorney, Agent, or Firm* — McDermott Will & Emery LLP

(57) ABSTRACT

An air vehicle fuselage adapted for transonic operation is disclosed. The fuselage has a body and a close-out. A lower surface of the body has a waterline value that varies along a fore-aft direction of the fuselage and is equal to a first waterline value at a forward end of the close-out and rise to a second waterline value at an aft end of the close-out. The lower surface has a drag-reduction blivet that includes a first region wherein the lower surface drops to a point comprising a third waterline value that is below the first waterline value and a first inward radius and then rises over a second region disposed aft of the first region wherein a second radius that is a minimum radius of the lower surface within the second region is greater than the first radius.

11 Claims, 3 Drawing Sheets

(56) References Cited

U.S. PATENT DOCUMENTS

| | | |
|---|---|---|
| 2004/0065774 A1 | 4/2004 | Hartmann et al. |
| 2005/0061916 A1 | 3/2005 | Sankrithi |
| 2005/0121555 A1 | 6/2005 | Morgenstern et al. |
| 2005/0224630 A1 | 10/2005 | Henne et al. |
| 2006/0038063 A1 | 2/2006 | Graham et al. |
| 2011/0133021 A1 | 6/2011 | Lugg |
| 2011/0180660 A1* | 7/2011 | Llamas Sandin ............ 244/1 N |
| 2012/0318919 A1* | 12/2012 | Brown et al. ................. 244/120 |

* cited by examiner

NOSE 4    BODY 6    14    CLOSE-OUT 8 though the appended drawings form a part thereof. In the appended drawings form a part thereof. In the appended drawings form a part thereof. In the appended drawings form a part thereof.

AIRCRAFT FUSELAGE DRAG REDUCTION BLIVET

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. Field

The present invention generally relates to the shape of an aircraft fuselage and, in particular, to a fuselage feature that reduces drag for transonic aircraft.

2. Description of the Related Art

The speed of aircraft that are traveling near or above the speed of sound is often given as a "Mach number," i.e. a dimensionless number that is the speed of the aircraft divided by the speed of sound. Vehicles moving at speeds well below Mach 1 are referred to as "subsonic" while vehicles moving at speeds well above Mach 1 are referred to as "supersonic." Vehicles traveling at speeds in the range of Mach 0.7-1.1 are referred to as "transonic" as the air flowing past the aircraft may locally be either above or below Mach 1.

Shockwaves can be generated by aircraft at locations where the local air velocity is at or above Mach 1. Transonic flow dynamics are nonlinear and drag on the aircraft increases significantly in regions where the air velocity locally exceeds Mach 1 and then "shocks" back to subsonic speed. The range of a subsonic aircraft increases as the speed increases. Thus, it is desirable for a subsonic aircraft to fly as close to Mach 1 as possible. When the speed of an aircraft enters the transonic region, however, the increased drag caused by shockwaves formed in regions where the air velocity exceeds Mach 1 may negate any additional gains in efficiency by further increases in speed or even reduce the overall efficiency if the speed is increased further.

SUMMARY

It is desirable to provide a fuselage shape that allows a subsonic aircraft to travel with increased efficiency. In particular, it is desirable to shape the rear portion of the fuselage of an aircraft, in the region where the fuselage tapers toward the tail, to minimize the drag induced by shock waves formed in this region when the aircraft is operating in the transonic region.

In certain aspects, an air vehicle fuselage adapted for transonic operation is disclosed. The fuselage has a body comprising a transition station at an aft end of the body, wherein a lower surface of the body has a first waterline value at the transition station. The fuselage also has a close-out coupled to the body at the transition station, wherein a lower surface of the close-out has a waterline value that varies along a fore-aft direction of the fuselage and is equal to the first waterline value at the transition station. The lower surface of the close-out connects to an upper surface of the close-out at an aft end of the close-out. The fuselage also has a drag-reduction blivet disposed on the lower surface of the close-out. The blivet includes a first region wherein the lower surface drops to a point comprising a third waterline value that is below the first waterline value and a first inward radius and a second region disposed aft of the first region wherein the lower surface rises while having a second radius is equal to a minimum radius of the lower surface within the second region, the second radius being greater than the first radius.

In certain aspects, an air vehicle fuselage adapted for transonic operation is disclosed. The fuselage has a body wherein a lower surface has a substantially constant first waterline value and a close-out wherein a forward end of the close-out is coincident with an aft end of the body. The close-out has a theoretical reference lower surface comprising a variable waterline value that is equal to the first waterline value at the forward end of the close-out and rises monotonically toward an aft end of the close-out without a radius of the reference lower profile within the close-out being less than a first radius. The close-out also has an actual lower surface comprising a variable waterline value that is equal to the first waterline value at the forward end of the close-out. The actual lower surface drops to a point comprising a third waterline value that is less than the first waterline value and a second radius that is less than the first radius then rising toward the aft end of the close-out. A third radius that is a minimum radius of the actual lower surface aft of the point is greater than the first radius.

In certain aspects, a method of reducing the total drag of a fuselage is disclosed. The method includes the steps of accelerating the air flowing past a lower surface of the close-out using a first portion of a blivet that comprises an outward deformation of the lower surface and then an inward high-curvature bend and minimizing further acceleration of the air flowing past the remainder of the lower surface of the close-out using a second portion of the blivet that comprises a low-curvature surface.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
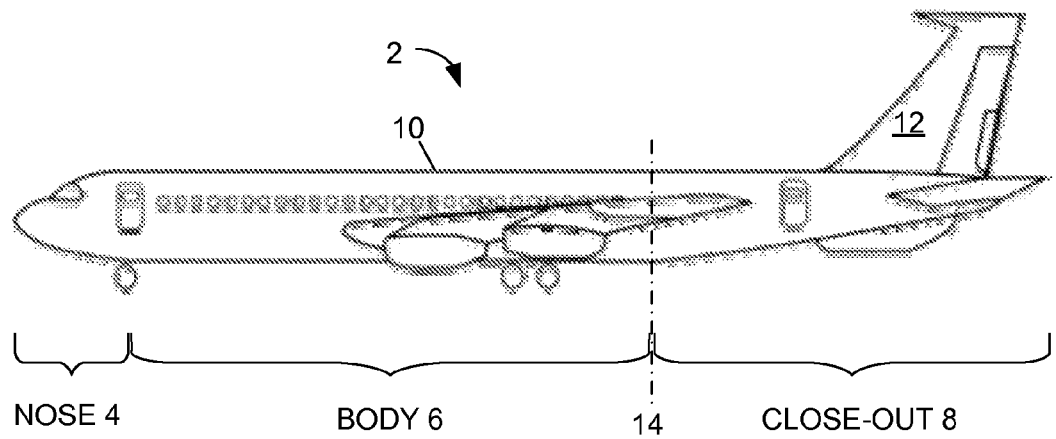
FIG. 1 depicts a profile of a conventional aircraft.

The following description discloses embodiments of an aircraft configured to reduce the drag coefficient of the lower aft portion, or close-out, of the fuselage. In certain embodiments, the fuselage is contoured to create specific air velocities or pressure coefficients in specific areas.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In the various figures, like components are labeled with identical element numbers for ease of understanding.

As used within this disclosure, the term "station" refers to a vertical plane that is perpendicular to a fore-to-aft axis of a fuselage. Within this disclosure, the "zero station" is selected to be forward of all structures such that all locations on the fuselage have a positive station. In certain aspects, numbers are assigned to stations that correspond to distances from the zero station along the fore-to-aft axis. The station of a first point will be greater than the station of a second point when the first point is aft of the second point.

As used within this disclosure, the term "waterline" refers to a horizontal plane through a fuselage. Within this disclosure, the "zero waterline" is selected to be below all structures such that all locations on the fuselage have a positive waterline value. The waterline value of a first point will be greater than the waterline value of a second point when the first point is above the second point.

As used within this disclosure, the term "profile" refers to a side view of a solid cross-section created using a vertical plane coincident with a fore-to-aft centerline of the fuselage. While an aircraft fuselage is generally contoured in three dimensions, a profile provides a two-dimensional picture of the external shape of the fuselage along the centerline.

As used within this disclosure, the terms "upper surface" and "lower surface" refer to the top and bottom edges of the profile of the fuselage. As the profile is a two-dimensional picture of the external shape of the fuselage, the upper and lower surfaces are actually lines that may be curved in the plane of the profile.

As used within this disclosure, the term "close-out" refers to an aft portion of an aircraft wherein the cross-sectional area of the stations tapers down from the cross-section of the main body to a smaller area and then "closes out" the fuselage as the lower surface and upper surface, as well as the side surfaces as this region is typically curved in three dimensions, are brought together to form the aft end of the fuselage.

As used within this disclosure, the term "radius" refers to the radius of the curvature of a line at a point along the line. For a first point along a line, wherein the line has a first radius at the first point, a circle drawn about a second point disposed along a perpendicular to the line at the first point at a distance from the line that is equal to the radius of the line at the first point will be tangent to the line at the first point. Each point along a line may have a different radius.

As used within this disclosure, the term "curvature" refers to the shape of a line, especially the lines that are referred to as the upper and lower surfaces as defined above. Low curvature is associated with a large radius and, conversely, high curvature is associated with a small radius.

As used within this disclosure, the term "inward" refers to a direction of curvature as one moves along a profile of the fuselage from fore to aft, wherein inward indicates that the profile is changing in a direction toward the interior of the fuselage. For the profile of the underside of the fuselage, the waterline value of the profile increases, i.e. the profile moves upward, over a bend having an inward radius.

As used within this disclosure, the term "outward" refers to a direction of curvature opposite to an inward radius. i.e. as one moves along a profile of the fuselage from fore to aft, the profile is changing in a direction away from the interior of the fuselage over an outward bend.

As used within this disclosure, the term "cross-section" generally refers to a plane that is perpendicular to a fore-aft axis of the fuselage, unless explicitly specified otherwise.

As used within this disclosure, the term "monotonic" refers to a profile wherein a moving reference point on the profile moves in a single direction, either up or down, as the point moves in a fore-to-aft direction along the profile. A monotonic profile will not have a bump wherein the profile first moves down and then moves up.

As used within this disclosure, the term "blivet" refers to a local deformation of the fuselage of an aircraft compared to a conventional smooth profile. In particular, this refers to the lower aft surface of the fuselage, wherein a conventional profile of the underside of the fuselage will taper smoothly from a body cross-section that is generally of constant waterline to a smaller tail cross-section. In certain aspects, a blivet may resemble a contoured secondary structure adhered to a conventional fuselage.

As used within this disclosure, the term "reference lower surface" refers to the shape of the lower surface, as seen in a profile, of the fuselage of an aircraft designed according to conventional methods.

As used within this disclosure, standard directions and directional adjectives such as "top," "bottom," "front," and "back" are defined relative to a fuselage in the conventional sense relative to the motion of an aircraft in flight moving forward and the conventional orientation of an aircraft flying above the ground, wherein "down" is toward the ground. The terms "forward" and "fore" are references to the front of the fuselage, while "rear," "rearward," and "aft" refer to the back of the fuselage.

As used within this disclosure, the term "air speed" generally refers to the velocity of the air, relative to the aircraft, at a small distance away from the surface of the aircraft. As a boundary layer of air attaches to the surface of the aircraft, the relative velocity of the air at the surface is zero. When discussing the local velocity of air relative to a proximate surface, the air velocity refers to the local velocity of air that is outside of the boundary layer. When discussing the velocity of a flying aircraft, the air velocity is that of the undisturbed air passing by the aircraft with respect to a reference point on the aircraft.

FIG. 1 depicts a profile of a conventional aircraft 2. The fuselage 10 of most aircraft can be considered to have three sections—a nose 4, a main body 6, and a close-out 8 that includes the tail 12. When viewed in a side-view profile, as shown in FIG. 1, the upper and lower surfaces of the body 6 are approximately horizontal and flat or at least having very large curvature. The body 6 transitions to the close-out 8 when the curvature of the lower surface increases, i.e. the lower surface turns upward. The fore-aft location of the transition location for this example aircraft 2 is indicated by the station 14.

Figure 2:
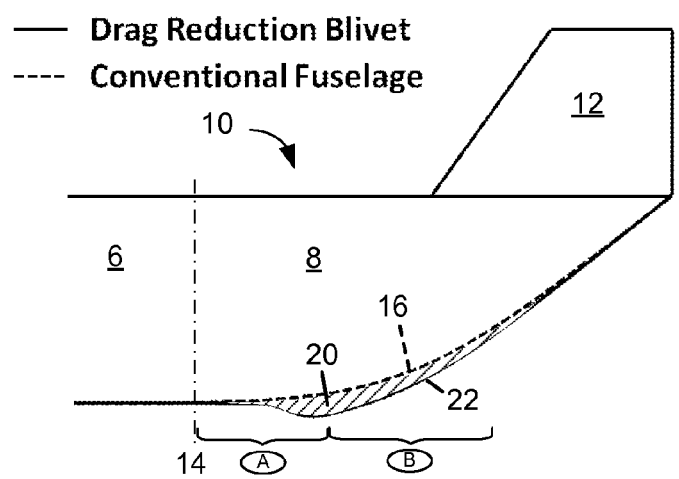
FIG. 2 depicts a profile of an exemplary air vehicle fuselage having a drag reduction blivet according to certain aspects of the present disclosure.

FIG. 2 depicts a profile of an exemplary air vehicle fuselage 10 having a drag-reduction blivet 20 according to certain aspects of the present disclosure. A conventional fuselage, such as shown in FIG. 1, has a profile of the lower surface of the close-out 8 as indicated by the dashed line 16, which increases monotonically from the waterline of the bottom of the body 6 at plane 14 to the upper surface at the aft end of the close-out 8. Conventional profiles generally have a curvature that is approximately zero at the main cross-section, increases monotonically to a peak value and then decreases monotonically to approximately zero. The curvature of this profile 16 is generally large and has only gradual changes.

The close-out 8 of FIG. 2 comprises a drag-reduction blivet 20 on the lower surface. The drag-reduction blivet 20 has a surface profile 22 that, relative to the surface profile 16 of a conventional fuselage, comprises an outward movement of the surface that takes the profile 22 of the blivet 20 below the waterline of the lower fuselage at the main cross-section 14. The profile also has high curvature over a portion of region A, followed by a region B having low curvature over the entire region 2. In certain embodiments, the curvature of region B is at least twice the curvature of the reference profile 16 within region B. The air accelerates along the fuselage surface between planes 14 and 16 as it moves to fill the volume behind the body 6 as the aircraft 2 moves forward in flight. The combination of shapes of the blivet 20 beneficially reduces the drag created by shock waves formed along the surface 22 at transonic speeds as the accelerated air exceeds Mach 1. The effect of the shape of the blivet 20 is discussed in greater detail with respect to FIG. 4.

One benefit of the profile 22 is that the vertical height of the body 6 at plane 14 is maintained for an increased distance aft of plane 14, compared to the profile 16 of a conventional fuselage. In other words, the internal space within the fuselage 10 is maintained at full internal height for an additional distance, thereby increasing the usable volume of the body 6. This enables an increase in various efficiency-related parameters, such as the maximum number of passengers, the amount of cargo that can be carried, or the maximum size of a cargo item that can be carried within the body 6.

Calculation of a specific fuselage profile 22 is an iterative process typically performed using compressible-flow fluid dynamics simulation software. In certain aspects, the software package can optimize an initial profile over a limited range to minimize a parameter, such as overall drag of the fuselage. For fuselage having a conventional profile 16, optimization typically refines the exact shape of the profile 8 without departing from the monotonic characteristic of profile 16.

The shape of the blivet disclosed herein is counterintuitive from a drag-reduction standpoint. Deforming the lower aft fuselage to protrude below the profile of the body 10 would intuitively be expected by those of skill in the art to produce an increase in drag, as the blivet has a non-monotonic/non-smooth curvature profile. Increasing the curvature to accelerate the flow in an area where a shock is occurring is counter-intuitive, but it is the combination of the increased curvature followed by the very low curvature that decreases the overall drag. The drag-reduction blivet 20 also reduces the wave drag, i.e. reduces the local pressure coefficient, as discussed in greater detail with respect to FIG. 4. The combination of the small radius bend followed by the large radius region of profile 22 has the same amount of lift compared the conventional profile but with a reduced delta pressure across the shock wave, compared to the drag created by a conventional profile 16, therefore a net reduction in the overall wave drag.

Figure 3:
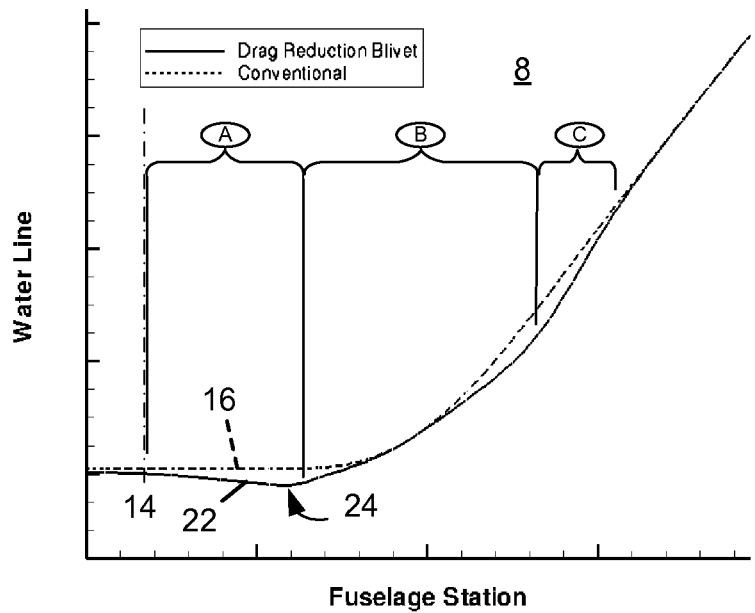
FIG. 3 depicts an enlarged view of a profile similar to that of the profile of FIG. 2 according to certain aspects of the present disclosure.

FIG. 3 depicts an enlarged view of a profile similar to that of FIG. 2 according to certain aspects of the present disclosure. It can be seen that the profile 22 has an outward bend and drops below profile 8 in a first section of region A, moving from the main cross-section 14 rearward, and then profile 22 makes a low-radius inward bend at point 24 in a second section of region A. Compared to the profile 16, the profile 22 of the lower surface has increased curvature, i.e. a smaller radius of curvature, in region A. In region B, the profile 22 is flatter, i.e. has a larger radius of curvature, than the profile 16. In region C, the profile 22 has an outward curve to return to the original profile 16 at the aft edge of region C, which in certain aspects coincides with the aft end of the close-out 8.

Figure 4:
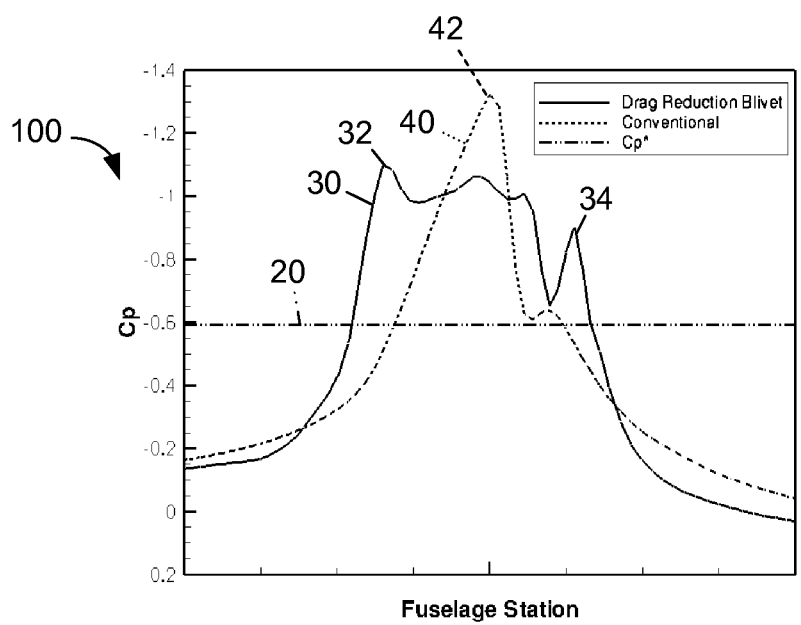
FIG. 4 is a plot of the pressure coefficients along the fuselage profiles of FIG. 2 according to certain aspects of the present disclosure.

FIG. 4 is a plot 100 of the pressure coefficients along the fuselage profiles 16 and 22 of FIG. 1 according to certain aspects of the present disclosure. A pressure coefficient (Cp) is calculated for points along the surface in lieu of the local air velocity to avoid the numeric difficulties in using the air velocity within the boundary layer to calculate the drag effect on the fuselage 10. Note that the Cp scale is plotted by convention as inverted, i.e. positive numbers at the bottom and negative numbers at the top. The Cp* line 20 indicates the boundary between subsonic flow below the line 20 and supersonic flow above the line 20. The more negative the Cp, i.e. upward in plot 100, the faster the air flow has been accelerated. The Cp at points along the conventional profile 16 is shown as line 40, while the Cp of profile 22 of the drag-reduction blivet is shown as line 30. The conventional fuselage profile 16 has a strong shock 42, indicated by a peak coefficient pressure coefficient and a nearly vertical segment in the pressure recovery region. The profile 22 of the drag-reduction blivet 20 accelerates the flow further forward because of the increased curvature in region A, as seen in FIG. 2, forming a first shock 32 having a peak value that is less than the peak value 42 of the line 40. The profile 22 then maintains the flow at a relatively constant velocity in the low-curvature region B. This reduction in velocity reduces the shock strength of a second shock 34 that is formed, in this example, further aft in region B or C. In the example of FIG. 4, the strong shock 42 created by profile 16 has been converted into a double shock 32, 34 having reduced peaks, i.e. neither Cp is as negative as the Cp of shock 42. In certain aspects, depending on the size and type of aircraft and the nominal profile 16, a profile 22 may be determined that prevents the second shock 34 from forming. In certain aspects, a pair of weaker shocks 32, 34 has less total drag than a single strong shock 42.

As the lift provided by the close-out 8 of the aircraft 2 is the same for both profiles 16 and 22 while the drag is reduced for profile 22 compared to profile 16, the lift-to-drag ratio of an aircraft 2 having a fuselage 10 with a profile 22 is greater than the lift-to-drag ratio of an aircraft 2 having a profile 16, and therefore the overall aerodynamic efficiency of an aircraft 2 using profile 22 is improved over the efficiency of an aircraft 2 with a conventional profile 16.

The reduced drag of the profile 22 also enables an aircraft 2 to go faster before reaching the same level of drag, i.e. the "drag rise" is delayed to a higher Mach number. The aerodynamic range factor (ARF) is given by equation 1:

$$ARF = \frac{Mach * Lift}{Drag} \quad (1)$$

An aircraft 2 having a higher ARF can transport a given cargo further or transport more cargo over a given distance with the same amount of fuel.

Figure 5:
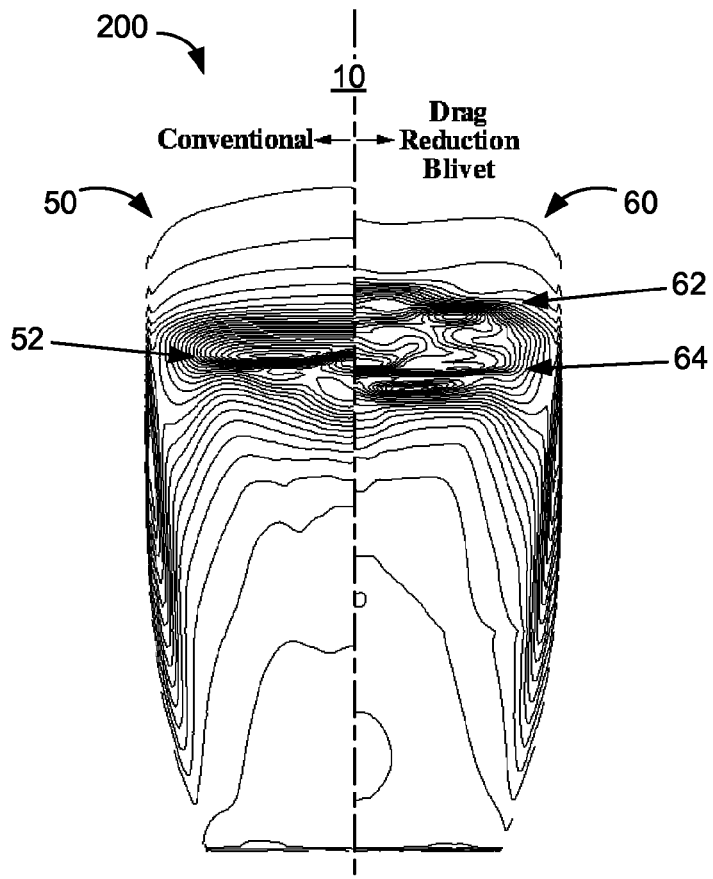
FIG. 5 is a plot of the pressure contours over the lower aft portion of fuselage having the profiles of FIG. 2 according to certain aspects of the present disclosure.

FIG. 5 is a plot 200 of the pressure contours 50, 60 over the lower aft portion of fuselage 10 having the profiles 16, 22 of FIG. 1 according to certain aspects of the present disclosure. The pressure contours as viewed as two-dimensional constant-pressure contours as seen from below the lower aft fuselage, i.e. the fuselage nose 4 is towards the top and the close-out 8 towards to the bottom of plot 200. The pressure contours 50 on the left are for the profile 16 of a conventional fuselage. The area where all the contour lines coalesce on the conventional fuselage side is a strong shock 52, matching the peak pressure coefficient 42 of FIG. 4. It can be seen that the shock 52 occurs as a lateral line across the width of the fuselage 10.

The pressure contours 60 on the right are for the profile 22 of an exemplary fuselage 10 according to certain aspects of the present disclosure. It can be seen that the first shock 62, corresponding to the peak pressure coefficient 32 of FIG. 4, occurs further forward than the shock 52. A second shock 64 is shown further aft, corresponding to the second peak 34 of the pressure coefficient. It can also be seen that the shocks 62, 64 do not span the same width of the fuselage 10 as the shock 52 of the conventional profile 16, further contributing to the reduction in drag.

Figure 6:
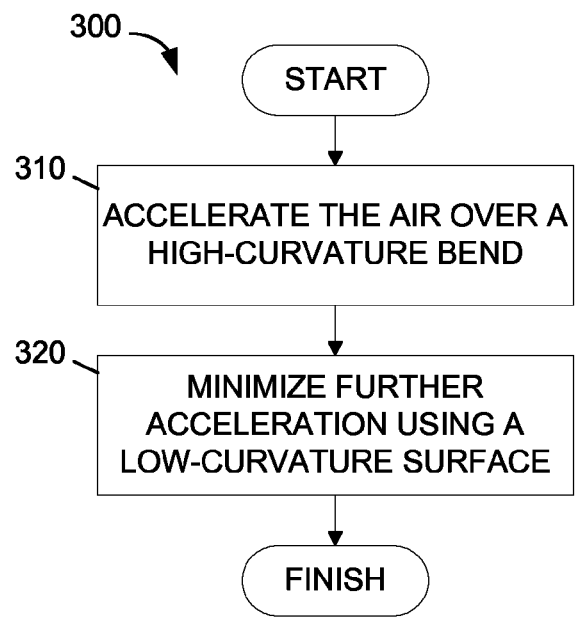
FIG. 6 is a flow chart of a process for reducing drag of an aircraft according to certain aspects of the present disclosure.

FIG. 6 is a flow chart 300 of a process for reducing drag of an aircraft according to certain aspects of the present disclosure. This process is continuous while the aircraft is in flight. The process starts as air flowing along the lower surface of fuselage 10 passes the transition to the close-out region of the fuselage 10. The air is accelerated in step 310 using a blivet that comprises a deformation of a first portion of the lower aft surface outward and then around an inward high-curvature bend. Further acceleration of the air is minimized in step 320 by a second portion of the blivet that comprises a low-curvature surface. The process is completed as the air moves away from the fuselage.

The disclosed examples of a drag reduction blivet reduce the overall drag of a fuselage that incorporates such a blivet in comparison to a similar fuselage having a conventional profile of the lower surface of the close-out. The combination of a first region having an outward displacement followed by an inward bend with a small radius and then followed by a second low-curvature region has been demonstrated to produce a net reduction in pressure coefficients, and therefore a lower net drag, than a conventional fuselage profile. This net reduction in drag would not be expected from a fuselage of this shape, as both the increased cross-sectional area and the smaller radius are known to increase drag.

It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims.

Reference to an element in the singular is not intended to mean "one and only one" unless specifically so stated, but rather "one or more." Use of the articles "a" and "an" is to be interpreted as equivalent to the phrase "at least one." Unless specifically stated otherwise, the term "some" refers to one or more.

Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "operation for."

Although embodiments of the present disclosure have been described and illustrated in detail, it is to be clearly understood that the same is by way of illustration and example only and is not to be taken by way of limitation, the scope of the present invention being limited only by the terms of the appended claims.

What is claimed is:

1. An air vehicle fuselage adapted for transonic operation, the fuselage comprising:
    a body comprising a transition station at an aft end of the body, wherein a lower surface of the body has a first waterline value at the transition station;
    a close-out coupled to the body at the transition station, wherein a lower surface of the close-out has a waterline value that varies along a fore-aft direction of the fuselage and is equal to the first waterline value at the transition station and wherein the lower surface of the close-out connects to an upper surface of the close-out at an aft end of the close-out; and
    a drag-reduction blivet disposed on the lower surface of the close-out, the blivet comprising:
    a first region wherein the lower surface drops to a point comprising a third waterline value that is below the first waterline value and a first inward radius; and
    a second region disposed aft of the first region wherein the lower surface rises while having a second radius is equal to a minimum radius of the lower surface within the second region, the second radius being greater than the first radius.

2. The fuselage of claim 1, wherein the lower surface of the body has an approximately constant waterline value.

3. The fuselage of claim 1, wherein the lower surface within the first region of the blivet comprises:
    a first section starting from the transition station wherein the lower surface comprises an outward bend; and
    a second section starting from the first section wherein the lower surface comprises an inward bend comprising the first inward radius.

4. The fuselage of claim 3, wherein the blivet comprises a third region disposed aft of the second region, the lower surface within the third region having an inward bend starting at the second region and transitioning to an outward curve.

5. An air vehicle fuselage adapted for transonic operation, the fuselage comprising:
    a body wherein a lower surface has a substantially constant first waterline value;
    a close-out wherein a forward end of the close-out is coincident with an aft end of the body, the close-out comprising:
    an imaginary reference lower surface comprising a variable waterline value that is equal to the first waterline value at the forward end of the close-out and rises monotonically toward an aft end of the close-out without a radius of the reference lower profile within the close-out being less than a first radius; and
    an actual lower surface comprising a variable waterline value that is equal to the first waterline value at the forward end of the close-out, the actual lower surface dropping to a point comprising a third waterline value that is less than the first waterline value and a second radius that is less than the first radius then rising toward the aft end of the close-out, wherein a third radius that is a minimum radius of the actual lower surface aft of the point is greater than the first radius.

6. The fuselage of claim 5, wherein the third radius is at least twice the second radius.

7. The fuselage of claim 5, wherein the waterline value of the actual lower surface is less than the waterline value of the reference lower surface over at least a portion of the close-out.

8. The fuselage of claim 5, wherein the lower surface within the close-out comprises:
 a first section starting from the body wherein the actual lower surface comprises an outward curve; and
 a second section starting from the first section wherein the actual lower surface comprises an inward curve comprising the second radius.

9. The fuselage of claim 8, wherein the close-out comprises a third section wherein the actual lower surface comprises an outward curve.

10. The fuselage of claim 5, wherein a first peak pressure coefficient of the actual lower surface within the close-out is less than a second peak pressure coefficient of the reference lower surface within the close-out.

11. The fuselage of claim 10, wherein a first total drag of a fuselage having the actual lower surface within the close-out is less than a second total drag of a fuselage having the reference lower surface within the close-out.

\* \* \* \* \*